(12) United States Patent
Schinnerer

(10) Patent No.: US 6,894,692 B2
(45) Date of Patent: May 17, 2005

(54) SYSTEM AND METHOD FOR SYCHRONIZING VIDEO DATA STREAMS

(75) Inventor: James A. Schinnerer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 151 days.

(21) Appl. No.: 10/167,098

(22) Filed: Jun. 11, 2002

(65) Prior Publication Data

US 2003/0227460 A1 Dec. 11, 2003

(51) Int. Cl.[7] ............................................. G06G 5/399
(52) U.S. Cl. ...................................... 345/539; 345/534
(58) Field of Search ................................ 345/501–506, 345/536, 539, 545, 531, 547, 534

(56) References Cited

U.S. PATENT DOCUMENTS

| | | | |
|---|---|---|---|
| 5,347,322 A | 9/1994 | Levine | 348/718 |
| 5,568,165 A * | 10/1996 | Kimura | 345/547 |
| 5,914,711 A | 6/1999 | Mangerson et al. | 345/203 |
| 5,946,049 A | 8/1999 | Cooper | 348/513 |
| 5,963,200 A | 10/1999 | Deering et al. | 345/213 |
| 6,092,119 A | 7/2000 | Rossmere et al. | 709/247 |
| 6,100,906 A | 8/2000 | Asaro et al. | 345/408 |
| 6,157,395 A | 12/2000 | Alcorn | 345/506 |
| 6,269,122 B1 | 7/2001 | Prasad et al. | 376/240.28 |
| 6,411,302 B1 * | 6/2002 | Chiraz | 345/545 |
| 6,470,051 B1 * | 10/2002 | Campisano et al. | 375/240.21 |
| 2003/0164833 A1 * | 9/2003 | Walls et al. | 345/506 |

* cited by examiner

Primary Examiner—Kee M. Tung

(57) ABSTRACT

A system for synchronizing video data streams utilizes a plurality of buffer pairs and buffering logic. The buffering logic is configured to receive image frames from a plurality of asynchronous video data streams and to perform comparisons between frame identifiers associated with the image frames. The buffering logic is further configured to double buffer the image frames via the plurality of frame buffer pairs based on the comparisons and to synchronously output the image frames from the frame buffer pairs.

31 Claims, 11 Drawing Sheets

SYSTEM AND METHOD FOR SYCHRONIZING VIDEO DATA STREAMS

BACKGROUND OF THE INVENTION

1. Field of the Invention

The present invention generally relates to data processing techniques and, in particular, to a system and method for synchronizing video data streams.

2. Related Art

Some graphical display systems employ a plurality of graphics pipelines, sometimes referred to as "graphics accelerators" or "graphics adapters," to render graphical data in parallel. Each of the graphics pipelines outputs a video data stream that is utilized by one or more display devices to display a graphical image based on the graphical data rendered by the graphics pipelines.

In many situations, the video data streams output by the graphics pipelines within a graphical display system are asynchronous. As known in the art of video signaling, the term "asynchronous video data streams" refers to a set of video data streams that are not frame synchronized with respect to one another. The timing of "asynchronous video data streams" is often controlled by clock signals derived from different clocks, sometimes referred to as "crystals." The term "synchronous video data streams," on the other hand, refers to a set of video data streams that are frame synchronized with respect to one another. The timing of "synchronous video data streams" is normally controlled by the same clock signal or at least clock signals derived from the same clock.

For a variety of reasons, it may be desirable to synchronize a set of asynchronous video data streams or, in other words, to convert a set of asynchronous video data streams into a set of synchronous video data steams. Synchronization of asynchronous video data streams is usually achieved via a triple buffer configuration. In this regard, buffering logic writes graphical data from an incoming video data stream into a first frame buffer within the triple buffer configuration. While the graphical data is being written into the first frame buffer, a display device receives a frame of graphical data from a second frame buffer of the triple buffer configuration. A third frame buffer in the triple buffer configuration stores graphical data defining the next image frame that is to be displayed by the display device.

After the display device completely receives the frame of graphical data stored in the second frame buffer, a buffer swap eventually occurs. In response to a buffer swap, the display device begins to receive data from the frame buffer (i.e., the third frame buffer) storing the graphical data of the next image frame, and the buffering logic begins writing the incoming video data stream to the frame buffer (i.e., the second buffer) that was read by the display device prior to the buffer swap. Moreover, the remaining frame buffer (i.e., the first frame buffer), which was being written to prior to the buffer swap, now stores graphical data that will be later used to display an image frame in response to the next buffer swap.

Moreover, each of the video data streams from the graphics pipelines in a graphical display system may be fed into the triple buffer configuration described above. By synchronizing the buffer swaps in each of the triple buffer configurations, each of the video data streams can be synchronized with respect to each other. Thus, the triple buffering techniques described above are suitable for synchronizing the video data streams output from the graphics pipelines of a graphical display system.

However, the aforedescribed synchronization techniques require at least three buffers for synchronizing a video data stream. Not all graphics cards include three or more buffers making such graphics cards unsuitable for synchronizing video data streams according to the aforedescribed techniques.

SUMMARY OF THE INVENTION

Generally, the present invention provides a system and method for synchronizing video data streams.

A system in accordance with an exemplary embodiment of the present invention utilizes a plurality of buffer pairs and buffering logic. The buffering logic is configured to receive image frames from a plurality of asynchronous video data streams and to perform comparisons between frame identifiers associated with the image frames. The buffering logic is further configured to double buffer the image frames via the plurality of frame buffer pairs based on the comparisons and to synchronously output the image frames from the frame buffer pairs.

The present invention can also be viewed as providing a method for synchronizing video data streams. The method can be broadly conceptualized by receiving image frames from a plurality of asynchronous video data streams, performing comparisons between frame identifiers associated with the image frames, double buffering the image frames, via a plurality of frame buffer pairs, based on the comparisons, and synchronously outputting the image frames from the frame buffer pairs based on the comparisons.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

The present invention generally provides a system and method for synchronizing video data streams. In this regard, buffering logic respectively writes image frames from a plurality of incoming asynchronous video data streams into a plurality of double buffers. Once the buffering logic determines that each of the video data streams transitions from transmitting a current image frame to transmitting a new image frame, the buffering logic performs a buffer swap for each of the double buffers. Upon performance of the buffer swap, the buffering logic synchronously outputs, from the double buffers, the image frames written to the double buffers prior to the buffer swap. Moreover, a set of image frames asynchronously written to the double buffers are synchronously output from the double buffers.

Figure 1:
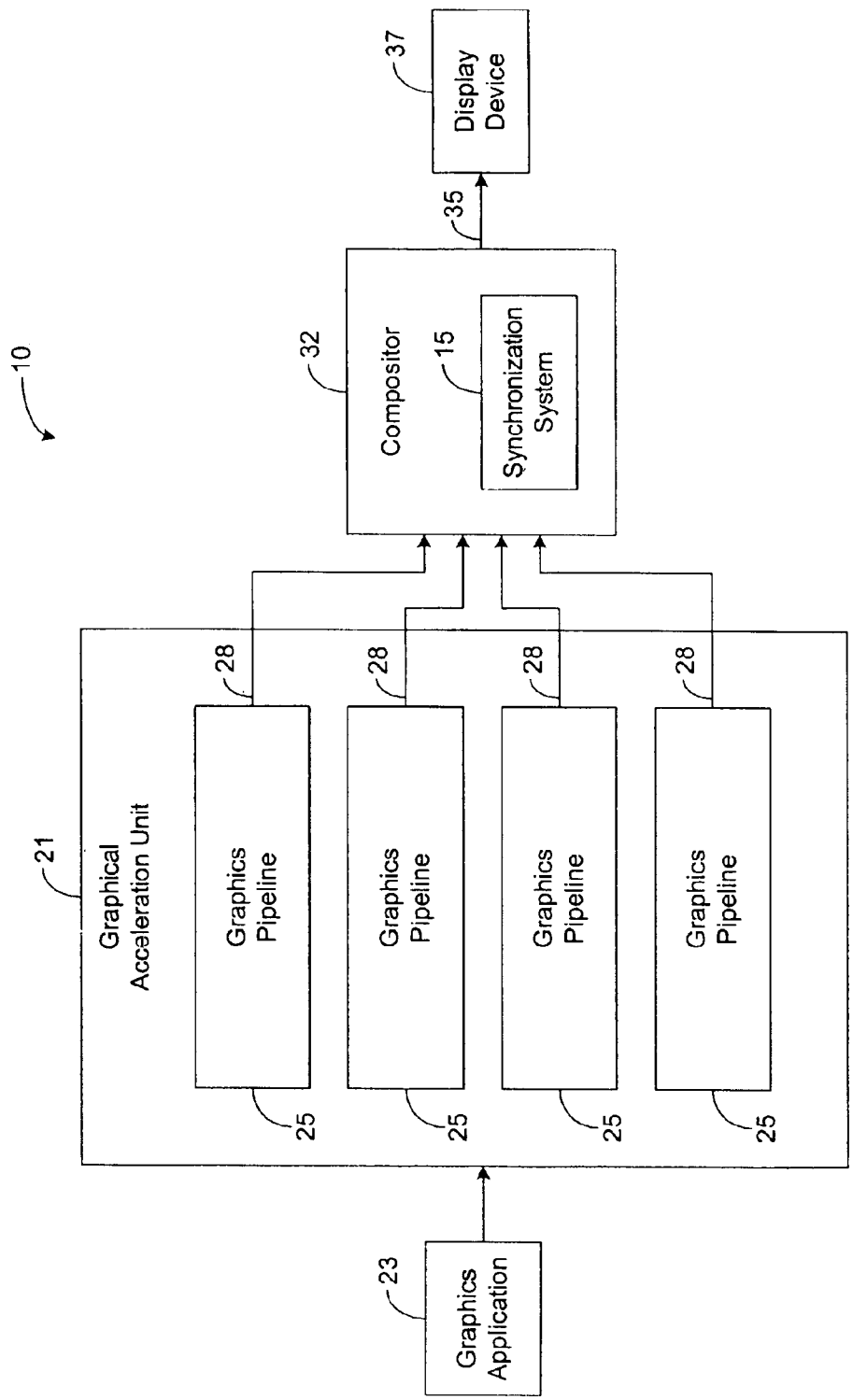
FIG. 1 is a block diagram illustrating a graphical display system employing a synchronization system in accordance with an exemplary embodiment of the present invention.

FIG. 1 depicts an exemplary graphical display system 10 employing a synchronization system 15 in accordance with a preferred embodiment of the present invention. In the example shown by FIG. 1, a graphical acceleration unit 21 receives graphical data from a graphics application 23 and renders the graphical data, in parallel, via a plurality of graphics pipelines 25. Moreover, each of the graphics pipelines 25 serially transmits image frames via a video data stream 28 to a compositor 32, which combines the video data streams 28 into a composite data stream 35. This composite data stream 35 serially transmits image frames that are displayed via a display device 37 (e.g., a cathode-ray tube). Techniques for rendering graphical data and for forming a composite data stream are generally described in commonly-assigned U.S. patent application Ser. No. 09/715, 335, entitled "System and Method for Efficiently Rendering Graphical Data," which is incorporated herein by reference.

Note that there are a variety of reasons for forming a composite data stream 35 based on graphical data from a plurality of graphics pipelines 25, as described above. For example, in one embodiment, each of the graphics pipelines 25 may be responsible for rendering only a portion of the overall image to be displayed by the display device 37. The compositor 32 may be configured to combine the graphical data from the plurality of data streams 28 in order to define a single data stream 35 that defines the entire image to be displayed by the display device 37. Such techniques may increase the speed at which the system 10 renders graphical data to the display device 37.

In another example, each of the pipelines 25 may be configured to render the same image. The compositor 32 may be configured to process the graphical data from the data streams 28 in order to perform jitter enhancement or anti-aliasing in an effort to improve the quality of the image actually displayed by the display device 37. In other embodiments, other techniques may be employed by the compositor 32 in forming the composite data stream 35.

Figure 2:
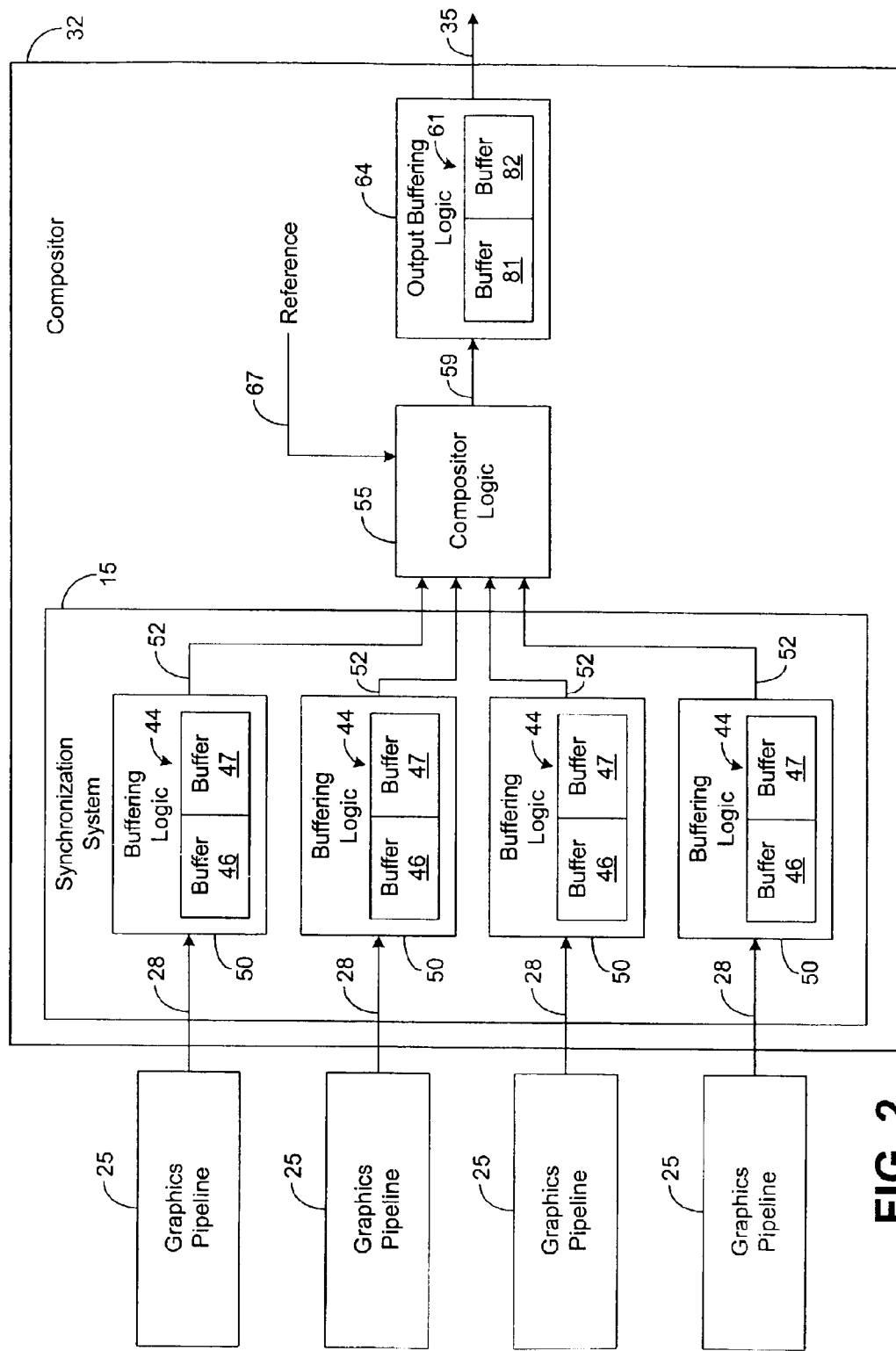
FIG. 2 is a block diagram illustrating a more detailed view of a compositor such as is depicted in FIG. 1.

However, before the video data streams 28 are utilized by the compositor 32 to form the composite data stream 35, the synchronization system 15 preferably synchronizes the video data streams 28. As shown by FIG. 2, the synchronization system 15 preferably comprises a plurality of double buffers 44. Each of the double buffers 44 comprises two frame buffers 46 and 47 that are each capable of storing an image frame received from the video data stream 28 output by one of the graphics pipelines 25. Reading and writing of each double buffer 44 is generally controlled by a set of buffering logic 50. Note that the buffering logic 50 can be implemented in software, hardware, or a combination thereof.

After the asynchronous video data streams 28 are synchronized into synchronous data streams 52 by the buffering logic 50, compositor logic 55 forms a composite data stream 59, which is then buffered by a double buffer 61 and output buffering logic 64. For each set of image frames simultaneously received from data streams 52 by the compositor logic 55, the compositor logic 55 preferably defines an image frame, referred to as a "composite image frame" based on the graphical data within the set of simultaneously received image frames. The compositor logic 55 then transmits this newly formed composite image frame as the next image frame in the composite data stream 59. Thus, each image frame defined by the composite data stream 59 is preferably based on graphical data from one or more synchronized frames of the video data streams 52. Note that the compositor logic 55 and the output buffering logic 64 can be implemented in software, hardware, or a combination thereof.

During operation, each set of buffering logic 50 writes graphical data from one of the asynchronous data streams 28 into one of the frame buffers 46 or 47 of its associated double buffer 44 and outputs data from the other frame buffer 46 or 47 of its associated double buffer 44. The data output from the other frame buffer 46 or 47 forms one of the synchronized data streams 52.

As used herein, the frame buffer 46 or 47 being written to by its associated buffering logic 50 shall be referred to as the "input frame buffer," and the frame buffer 46 or 47 from which graphical data is being output by the associated buffering logic 50 shall be referred to as the "output frame buffer." Note that, in the preferred embodiment, the buffering logic 50 only writes graphical data into the frame buffer 46 or 47 designated as the input frame buffer and only outputs graphical data from the frame buffer 46 or 47 designated as the output frame buffer. Furthermore, as will be described hereafter, when a set of buffering logic 50 performs a "buffer swap" on a double buffer 44, the set of logic 50 changes which of the frame buffers 46 or 47 of the double buffer 44 is being written to and which of the frame buffers 46 or 47 of the double buffer 44 is being output from. Thus, a buffer swap changes which of the frame buffers 46 or 47 of the double buffer 44 is designated as the "input frame buffer" and changes which of the frame buffers 46 or 47 of the double buffer 44 is designated as the "output frame buffer."

In the preferred embodiment, each image frame of a video data stream 28 is generally separated from its preceding image frame by a vertical sync signal, commonly referred to as "V-sync." Moreover, by detecting and/or tracking the vertical sync signals within a video data stream 28, it is possible to detect the beginnings and/or endings of the image frames included in the video data stream 28.

Furthermore, each image frame of a video data stream 28 preferably includes or is otherwise associated with a frame identifier that identifies the image frame from different image frames (i.e., frames defining different images) transmitted via the same data stream 28. In the preferred embodiment, the frame identifier of an image frame is included at the end of its image frame (i.e., just prior to the V-sync signal that separates the image frame from the following image frame). However, in other embodiments, the image identifier may be located in other locations, such as the beginning of its image frame (i.e., just after the V-sync signal that separates the image frame from the preceding image frame). In addition, it is not necessary for the frame identifier to be included in the data stream 28 of its associated image frame. For example, the frame identifier may be transmitted in parallel with its associated image frame. Various other techniques for identifying the different image frames of a particular data stream 28 are possible in other embodiments.

When buffering logic 50 receives an image frame from an asynchronous data stream 28, the logic 50 writes the image frame to one of its frame buffers 46 or 47. For illustrative purposes, assume that frame buffer 46 is currently designated as the "input frame buffer" and that frame buffer 47 is, therefore, currently designated as the "output frame buffer." Thus, the logic 50 writes the image frame to frame buffer 46 and outputs, via a data stream 52, the graphical data stored in frame buffer 47.

Furthermore, to ensure that the video data streams 52 are synchronized, it may be desirable for each set of buffering logic 50 to utilize the same timing signal for transmissions. In this regard, to synchronously transmit a set of image frames, each set of buffering logic 50 preferably begins transmitting an image frame within the set at the same time. This may be accomplished by configuring each set of buffering logic 50 to begin transmitting its image frame on the same rising or falling edge of the same timing signal. The timing signal may be a clock signal (not specifically shown) or some other suitable signal. In the preferred embodiment, the synchronization system 15 receives a timing signal, referred to hereafter as "reference data stream 67" (FIG. 2), that includes V-sync signals occurring at the same frequency as the V-sync signals in the data streams 28. In fact, if desired, one of the data streams 28 may be utilized as the reference data stream 67.

Moreover, when a set of buffering logic 50 is ready to transmit a next image frame, the set of buffering logic 50 preferably waits until the end of the next V-sync signal that occurs in the reference data stream 67. Each set of buffering logic 50 is preferably configured to do the same, and the data streams 52 are, therefore, transmitted synchronously.

The data streams 28, on the other hand, are asynchronous, and the sets of buffering logic 50 may begin receiving image frames from the different data streams 28 at different times. Furthermore, in the preferred embodiment, a graphics pipeline 25 repetitively transmits the same image frame until the pipeline 25 performs a buffer swap. Thus, the frame identifiers associated with or included in the image frames that are transmitted between consecutive buffer swaps by the graphics pipeline 25 preferably do not change from frame-to-frame. However, after performing a buffer swap, the pipeline 25 begins repetitively transmitting a new image frame after the occurrence of the next V-sync signal in the pipeline's video data stream 28. This new image frame defines an image different than the preceding image frame transmitted prior to the buffer swap and, therefore, has a different frame identifier.

Moreover, as long as a set of buffering logic 50 continues to receive the same image frames (i.e., image frames having the same frame identifier) from one of the data streams 28, the logic 50 preferably writes each image frame received from the data stream 28 into the input frame buffer 46. In this regard, the input frame buffer 46 preferably stores only one image frame, and each frame written to the input frame buffer 46 preferably replaces the image frame previously written to the input frame buffer 46.

Once the logic 50 receives a different image frame (i.e., an image frame having a different frame identifier), the logic 50 writes the different image frame to the input frame buffer 46 and then preferably discards any further data received from the data stream 28 until the logic 50 later performs a buffer swap, which will be described in more detail hereafter. Furthermore, after writing the different image frame to the input frame buffer 46, the logic 50 asserts a swap authorization signal 73 (FIG. 3).

Figure 3:
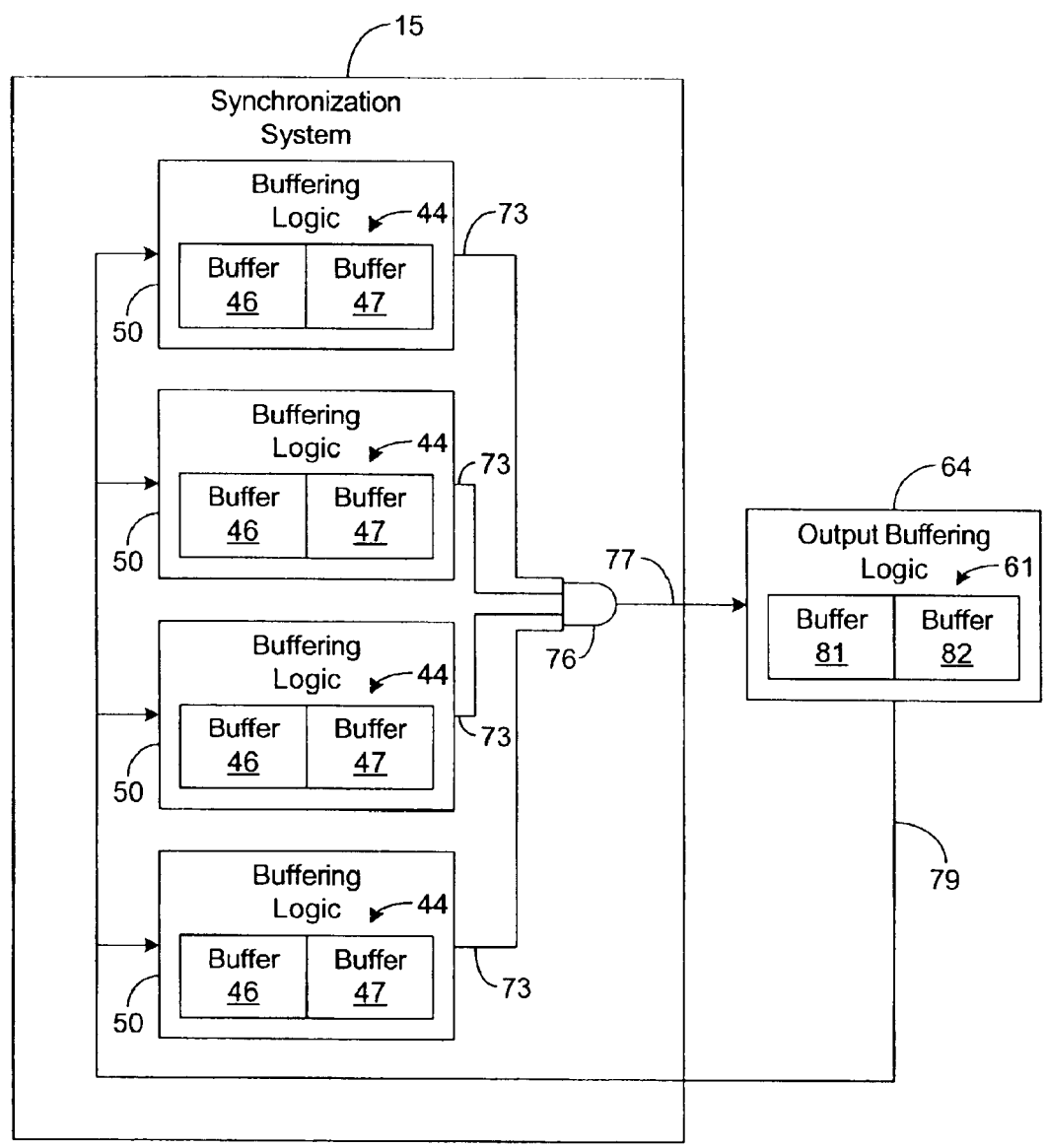
FIG. 3 is a block diagram illustrating a more detailed view of the synchronization system such as is depicted in FIG. 1.

As shown by FIG. 3, the swap authorization signals 73 are preferably anded by an AND gate 76. The output of the AND gate 76 shall be referred to hereafter as a "swap ready signal 77." The swap ready signal 77 is preferably asserted when each of the swap authorization signals 73 is asserted. Otherwise, the swap ready signal 77 is deasserted.

In response to a detection of an asserted swap ready signal 77, the output buffering logic 64 performs various functionality, which will be described in more detail hereafter. One step performed by the output buffering logic 64 in response to such a detection is toggling of a swap command signal 79 upon the next occurrence of a V-sync signal in the reference data stream 67. This swap command signal 79 is preferably transmitted to each of the sets of buffering logic 50 included in the synchronization system 15.

Moreover, when the swap command signal 79 is toggled, each set of buffering logic 50 has received a new image frame and has written this new image frame into the input frame buffer 46 of its respective double buffer 44. Furthermore, in response to the toggling of the swap command signal 79, each set of buffering logic 50 performs a buffer swap. More specifically, each set of buffering logic 50 swaps the designation of the frame buffers 46 and 47 such that the frame buffer 47 previously designated as the "output frame buffer" is now designated as the "input frame buffer" and such that the frame buffer 46 previously designated as the "input frame buffer" is now designated as the "output frame buffer." Thus, each set of buffering logic 50 outputs the new image frame stored in frame buffer 46 and begins writing the image frames received from its respective data stream 28 into frame buffer 47.

Note that each set of buffering logic 50 preferably outputs its new image frame (i.e., the image frame stored in the frame buffer 46 newly designated as the "output frame buffer") at the same time in order to enable synchronization of the video data streams 52. The foregoing may be achieved by configuring each set of buffering logic 50 to output its new image frame in response to (e.g., at the end of) the next occurrence of a V-sync signal in the reference data stream 67 once the set of buffering logic 50 has detected assertion of the swap command signal 79.

Once a set of buffering logic 50 has output its new image frame in response to a detected toggling of the swap command signal 79, the set of buffering logic 50 preferably deasserts its swap authorization signal 73. Note that deassertion of any of the swap authorization signals 73 causes the swap ready signal 77 to become deasserted as well.

For each set of image frames simultaneously transmitted, via data streams 52, by the buffering logic 50 and received by the compositor logic 55, the compositor logic 55 forms a composite image frame that is based on graphical data from one or more of the set of image frames. This composite image frame is then output from the compositor logic 55 via composite data stream 59. Therefore, when the buffering logic 50 of the synchronization system 15 synchronously outputs new image frames in response to toggling of the swap command signal 79, the compositor logic 55 receives these new image frames and forms a composite image frame, referred to hereafter as the "new composite image frame," based on the new image frames received from the data streams 52. The compositor logic 55 then transmits the new composite image frame to the output buffering logic 64.

Upon receiving the new composite image frame, the output buffering logic 64 is configured to write the new composite image frame to its frame buffer 81 or 82 that is designated as the "input frame buffer." For illustrative purposes, assume that the frame buffer 81 is currently designated as the "input frame buffer" and that the frame buffer 82 is, therefore, designated as the "output frame buffer."

After writing the new composite image frame to the input frame buffer 81, the output buffering logic 64 then performs a buffer swap. More specifically, the output buffering logic 64 swaps the designation of the frame buffers 81 and 82 such that the frame buffer 82 previously designated as the "output frame buffer" is now designated as the "input frame buffer" and such that the frame buffer 81 previously designated as the "input frame buffer" is now designated as the "output frame buffer." Thus, the output buffering logic 64 outputs, via data stream 35, the new composite image frame stored in frame buffer 81. At this point, the display device 37 (FIG. 1) begins to display the new composite image frame.

Note that the aforedescribed process is repeated by the system 10 as the image frames output from the graphics pipelines 28 change. In this regard, the graphics pipelines 25 periodically receive buffer swap commands instructing each of the graphics pipelines 25 to perform a buffer swap. For each commanded buffer swap, a graphics pipeline 25, after the next occurrence of a V-sync signal in the data stream 28 output by the pipeline 25, begins to output a new image frame that is different than the image frame previously output by the graphics pipeline 25. Since the data streams 28 are asynchronous, each of the graphics pipelines 28 begins outputting its new image frame in response to the same buffer swap command at a different time.

Moreover, as described above, the buffering logic 50 waits until each of the new image frames from each of the pipelines 25 has been received and written into one of the double buffers 44 of the synchronization system 15. Once this occurs, the sets of buffering logic 50 synchronously transmit the new image frames to the compositor logic 55. The compositor logic 55 then combines these new image frames into a composite image frame that is received and buffered by the output buffering logic 64 and the double buffer 61.

Accordingly, each set of new image frames output by the graphics pipelines 25 in response to the same buffer swap command is synchronized by the synchronization system 15 and then combined by the compositor logic 55 into a composite image frame. However, it should be noted that forming a composite data stream 59 based on the synchronized data streams 52 is not a necessary feature of the present invention.

Figure 4:
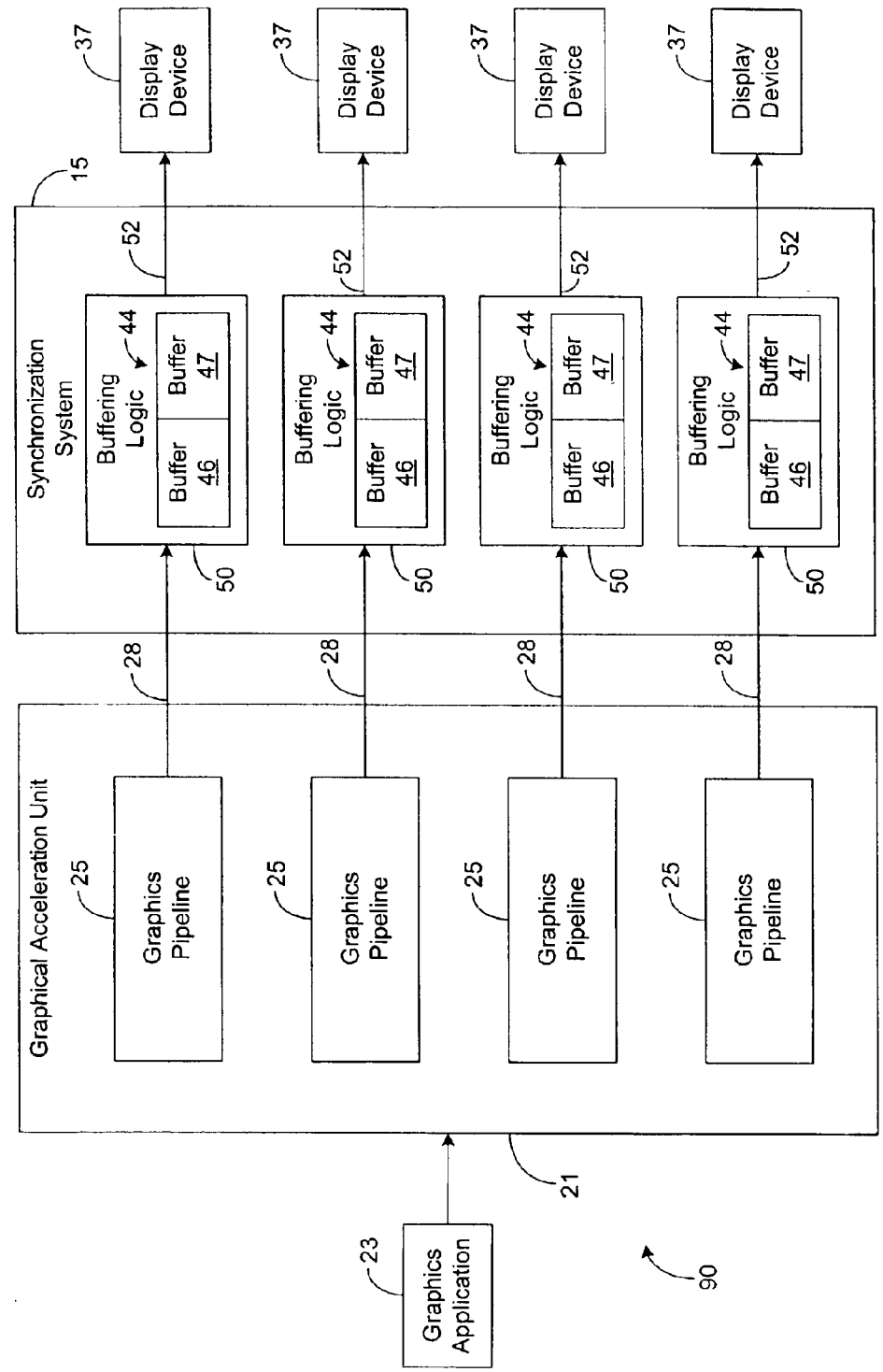
FIG. 4 is block diagram illustrating another embodiment of a graphical display system that may be utilized to employ the synchronization system such as is depicted in FIG. 1.
Figure 5:
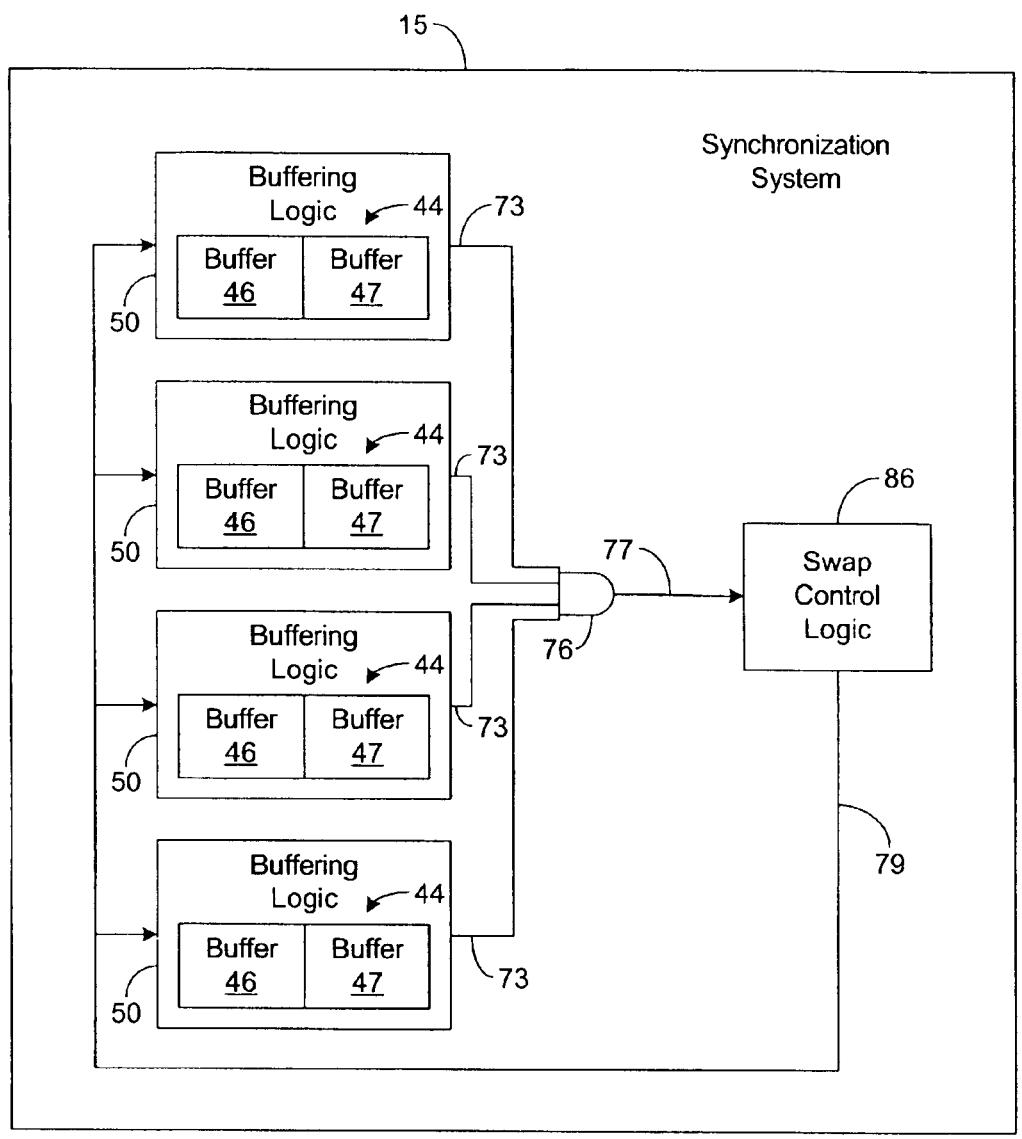
FIG. 5 is a block diagram illustrating a more detailed view of the synchronization system such as is depicted in FIG. 4.

For example, commonly-assigned U.S. Pat. No. 6,249, 294, which is incorporated herein by reference, generally describes a graphical display system that utilizes a plurality of graphics pipelines to render graphical data to a plurality of display devices. The synchronization system 50 may be implemented, if desired, in such a graphical display system. In this regard, each synchronized data stream 52 may be provided directly to a different display device 37 without being processed by the compositor logic 55. FIGS. 4 and 5 depict an exemplary graphical display system 90 in accordance with such an embodiment.

Note that, in FIG. 5, swap control logic 86 is configured to control the swap command signal 79 according to the same techniques described above for output buffering logic 64. In this regard, the swap control logic 86 is preferably configured to toggle the swap control signal 79 upon the next occurrence of a V-sync signal in the reference data stream 67 once the control logic 86 detects that the swap ready signal 77 is asserted.

In addition, it should be noted that the synchronization system 15 may be employed within graphical display systems that render stereographic data. As is known in the art, stereographic data defines multiple perspectives for each displayed image frame. Typically, the multiple perspectives include a left perspective for viewing with a user's left eye and a right perspective for viewing with a user's right eye.

In active stereo, the display image presented to the user is alternated between the left and right image perspectives. Furthermore, the user wears a pair of stereographic eyeglasses that have a shutter mechanism for blocking the user's right eye view when the left perspective is being displayed and for blocking the user's left eye view when the right perspective is being displayed. As a result, the user views a stereographic image having images that appear in three-dimensional (3D) form.

In passive stereo, each perspective of an image is simultaneously projected by a different image projector. The projected images are polarized such that each of the perspectives can be separately filtered for stereographic viewing. In this regard, the user wears a pair of stereographic eyeglasses that filter the left perspective from the user's right eye and that filter the right perspective from the user's right eye. Thus, by wearing the stereographic glasses, the user sees a 3D view of the projected images.

In rendering stereographic data, each consecutive image frame output by a graphics pipeline 25 defines a different perspective of the same image until a buffer swap is performed by the graphics pipeline 25. In this regard, the perspectives alternate between the left perspective and the right perspective. Once a buffer swap is performed, each consecutive image frame output by the graphics pipeline 25 defines an alternating perspective of a new image.

As long as the frame identifiers of the data stream 28 received by the buffering logic 50 indicate that the last image frame (i.e., the image frame most recently received by the buffering logic 50) defines a perspective of the same image that is defined by the penultimate image frame (i.e., the image frame received prior to the last image frame), the buffering logic 50 writes the graphical data of the last image frame into the frame buffer 46 or 47 designated as the input frame buffer. For illustrative purposes, assume that the frame buffer 46 is currently designated as the "input frame buffer" and that the frame buffer 47 is, therefore, currently designated as the "output frame buffer."

Note that the input frame buffer 46 preferably stores both perspectives of the same image. In this regard, when writing graphical data of an image frame defining a right perspective, the buffering logic 50, in the preferred embodiment, only overwrites previously stored right perspective graphical data. Furthermore, when writing graphical data of an image frame defining a left perspective, the buffering logic 50, in the preferred embodiment, only overwrites previously stored left perspective graphical data.

In addition, when the buffering logic 50 determines that the last image frame defines an image different than the penultimate image frame, the buffering logic 50 writes the graphical data of both the last image frame and the next image frame (i.e., the image frame received after the last image frame) to the input frame buffer 46 before asserting its swap authorization signal 73 and before discarding image frames from the data stream 28. Note that waiting for the next image frame before discarding image frames from the data stream 28 enables the buffering logic 50 to store both perspectives of the new image in the input frame buffer 46 before performing a buffer swap.

Once all of the swap authorization signals 73 are asserted, the output buffering logic 64 toggles the swap command signal 79 on the next occurrence of a V-sync signal in the reference data stream 67. In response, each set of buffering logic 50 performs a buffer swap, according to the techniques described above. In this regard, each set of buffering logic 50 swaps the designation of the frame buffers 46 and 47 such that the frame buffer 46 previously designated as the "input frame buffer" is now designated as the "output frame buffer" and such that the frame buffer 47 previously designated as the "output frame buffer" is now designated as the "input frame buffer." Each set of buffering logic 50 then outputs, in a first image frame, one of the perspectives stored in the output frame buffer 46. Then, each set of buffering logic 50 outputs, in a second image frame, the other perspective stored in the output frame buffer 46.

Moreover, once the output buffering logic 64 toggles the swap command signal 79, the output buffering logic 64 waits for both a left perspective and a right perspective of a new composite image. After receiving these perspectives and writing these perspectives to the frame buffer 81 or 82 designated as the "input frame buffer," the logic 64 performs a buffer swap. After performing this buffer swap, the graphical data in the frame buffer 81 or 82 designated as the output buffer defines a left and right perspective of a new composite image. This graphical data may then be presented to a user via conventional stereographic display techniques.

Figure 6:
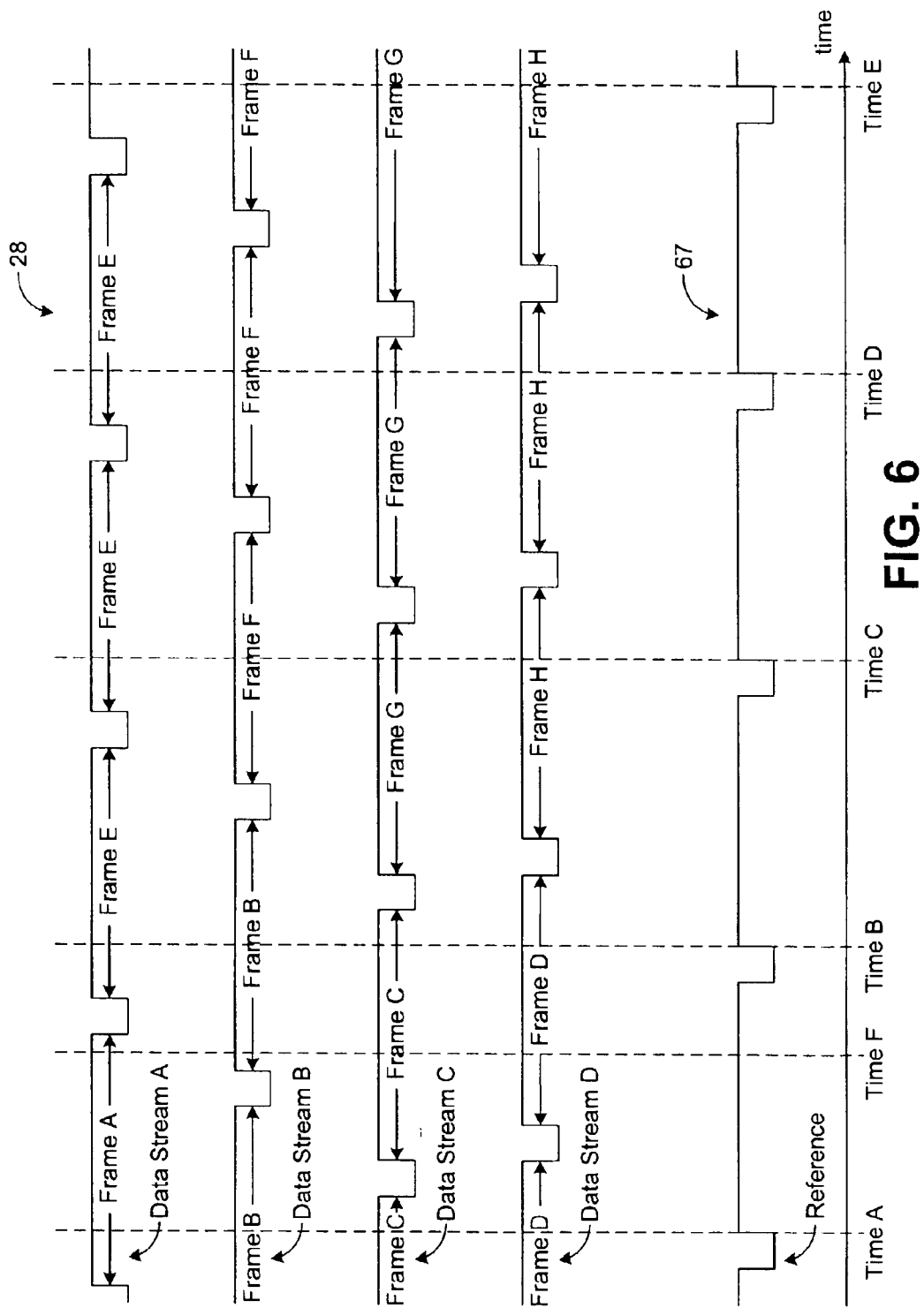
FIG. 6 is timing diagram illustrating a plurality of asynchronous data streams transmitted from graphics pipelines such as are depicted in FIG. 1.

Assume for illustrative purposes that the graphics application 23 produces non-stereoscopic data for rendering by the graphics pipelines 25 of FIG. 1. Further assume that FIG. 6 depicts a timing diagram for four data streams 28, referred to hereafter as data streams A–D, received by the synchronization system 15. Also, assume that, at the beginning of the timing diagram shown by FIG. 6 (e.g., prior to Time A), the Data Streams A–D are transmitting Frames A–D, respectively. Furthermore, also assume that, at the beginning of the timing diagram shown by FIG. 6, each of the frame buffers 46 is designated as an "input frame buffer" and that each of the frame buffers 47 is designated as an "output frame buffer." Thus, at the beginning of the foregoing timing diagram, each of the Frames A–D is stored in the input frame buffer 46 of a different one of the double buffers 44 residing within the synchronization system 15. Furthermore, assume that the data stream 67, referred to as "Reference" in FIG. 6, is a reference signal upon which each of the data streams 52 is synchronized. Therefore, each set of buffering logic 50 may begin to output, via a data stream 52, an image frame at each of the Times A–E.

Figure 7:
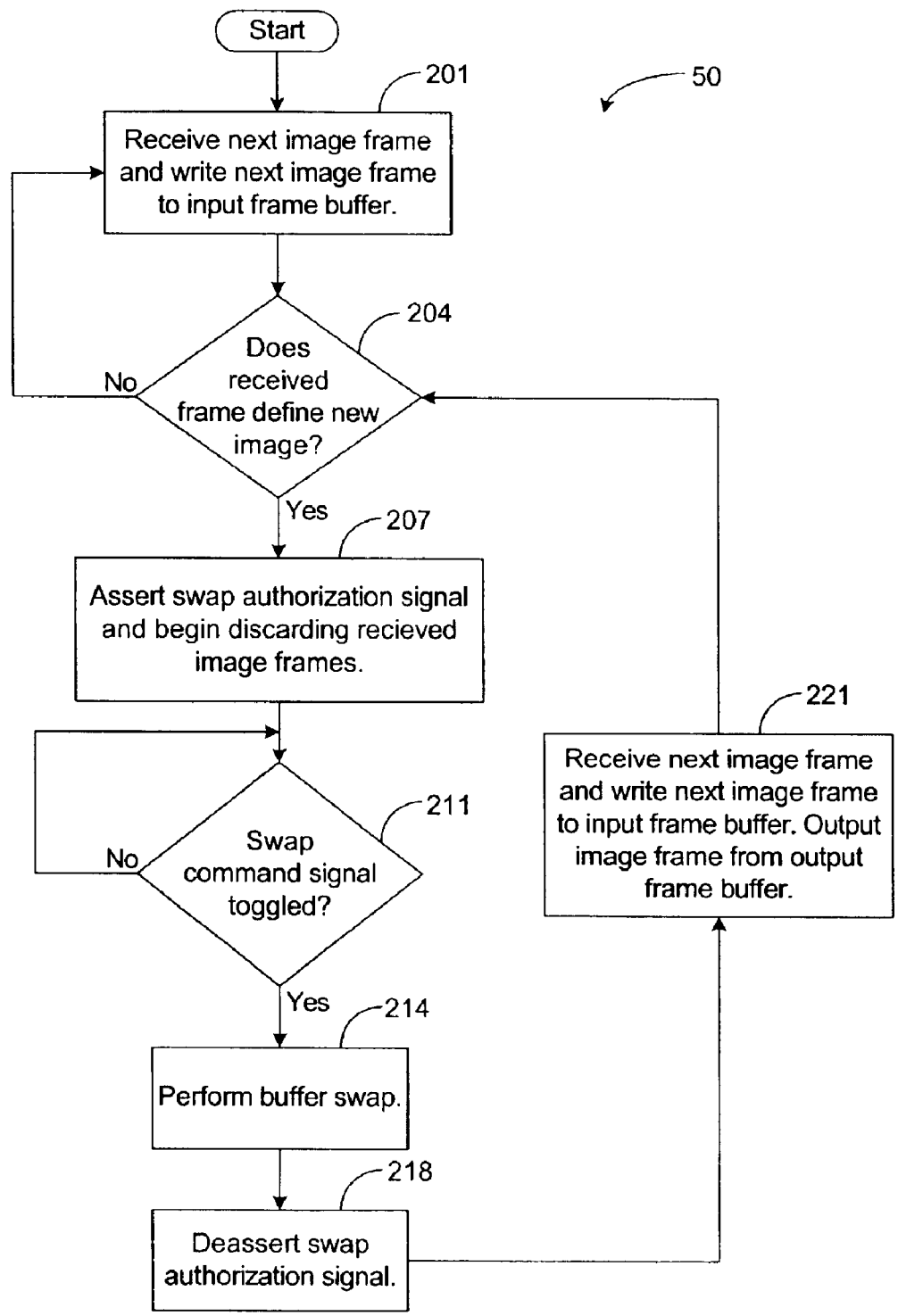
FIG. 7 is a flow chart illustrating an exemplary architecture and functionality of buffering logic such as is depicted in FIG. 2 for processing non-stereographic data.

At the beginning of the timing diagram, each set of buffering logic 50 is receiving one of the Frames A–D and writing the received image frame in its input frame buffer 46 via block 201 of FIG. 7. Each time a set of buffering logic 50 receives a new Frame A–D, the buffering logic 50 checks, in block 204, to determine whether the received frame defines a different image than the frame previously received by the logic 50. In the present example, block 204 may be performed by comparing the frame identifier of the last image frame to the frame identifier of the penultimate image frame. If the frame identifiers do not match, then a "yes" determination is made in block 204. Otherwise, a "no" determination is made in block 204.

Assume that at Time F, the graphics pipelines 25 are commanded to perform a buffer swap. Thus, in response to the buffer swap command, the graphics pipelines 25 begin to transmit Frames E–H in lieu of Frames A–D, respectively. However, the Data Streams A–D transmitted by the pipelines 25 are asynchronous, and as can be seen by viewing FIG. 6, the first transmissions of Frames E–H begin at different times.

At Time B, none of the sets of buffering logic 50 has completely received one of the new Frames E–H. Therefore, each of the sets of buffering logic 50 makes a "no" determination in block 204. However, between Time B and Time C, the set of buffering logic 50 receiving Data Stream A completely receives an image frame (i.e., Frame E) defining a different image than the image frame (i.e., Frame A) previously received by the logic 50. Thus, prior to Time C, the foregoing set of buffering logic 50 makes a "yes" determination in block 204 and, in response, asserts its swap authorization signal 73 in block 207. Note that the newly received image frame (i.e., Frame E) was written to the logic's input buffer 46 in block 201. As shown by blocks 207 and 211, the foregoing set of buffering logic 50 then waits for toggling of the swap command signal 79 while discarding the Data Stream A.

Between Time C and Time D, each of the remaining sets of buffering logic 50 completely receives a new image frame (i.e., Frames F–H, respectively). Thus, prior to Time D, each of the remaining sets of buffering logic 50 makes a "yes" determination in block 204 and, in response, asserts its swap authorization signal 73 in block 207. Note that the newly received image frames (i.e., Frame F–H) were written to a respective one of the input buffers 46 via block 201. As shown by blocks 207 and 211, each of the remaining sets of buffering logic 50 then waits for toggling of the swap command signal 79 while discarding the Data Streams B–D. At this point, all of the swap authorization signals 73 are asserted, and the swap ready signal 77, therefore, becomes asserted as well. As will be described in further detail below, the output buffering logic 64, in response to the assertion of the swap ready signal 77, toggles the swap command signal 79 upon the next occurrence of a V-sync signal (i.e., during the V-sync signal ending at Time D) in the reference data stream 67.

In response to the toggling of the swap command signal 79, each of the sets of buffering logic 50 performs a buffer swap and deasserts its swap authorization signal 73, as shown by blocks 214 and 218. Note that blocks 214 and 218 are preferably performed just prior to Time D. At time D, the foregoing sets of buffering logic 50 respectively output Frames E–H via block 221. Furthermore, at Time D, the sets of buffering logic 50 stop discarding the data streams E–H and begin respectively writing Frames E–H to their input frame buffers 47. Note that the designation of "input frame buffer" changed to frame buffer 47 during the foregoing buffer swap performed in block 214.

The Frames E–H output by the sets of buffering logic 50 at Time D are received by the compositor logic 55 and combined into a composite image frame, referred to as "new composite image frame." This new composite image frame is received and buffered by the output buffering logic 64. In this regard, once the output buffering logic 64 detects the aforementioned assertion of the swap ready signal 77 in block 244 of FIG. 8 and toggles the swap command signal 79 in block 245, the output buffering logic 64 proceeds to block 246 and waits for the new composite image frame.

Once the output buffering logic 64 has received the new composite image frame, the output buffering logic 64 writes the new composite image frame to its input frame buffer 81 or 82 and then performs a buffers swap, as shown by blocks 249 and 252. After performing the buffer swap in block 252, the output buffering logic 64 outputs the new composite image frame and then waits for the next assertion of the swap ready signal 77, as shown by blocks 244 and 254.

Figure 8:
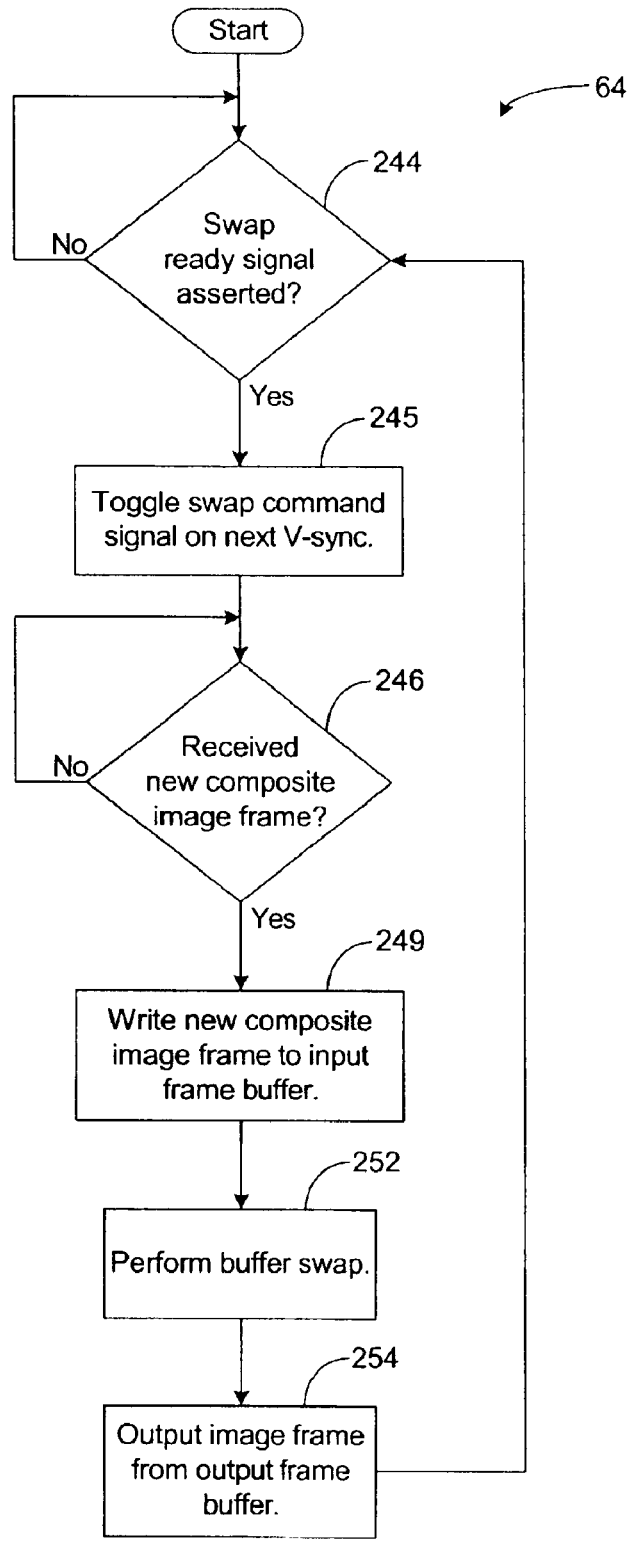
FIG. 8 is a flow chart illustrating an exemplary architecture and functionality of output buffering logic such as is depicted in FIG. 2 for processing non-stereographic data.
Figure 9:
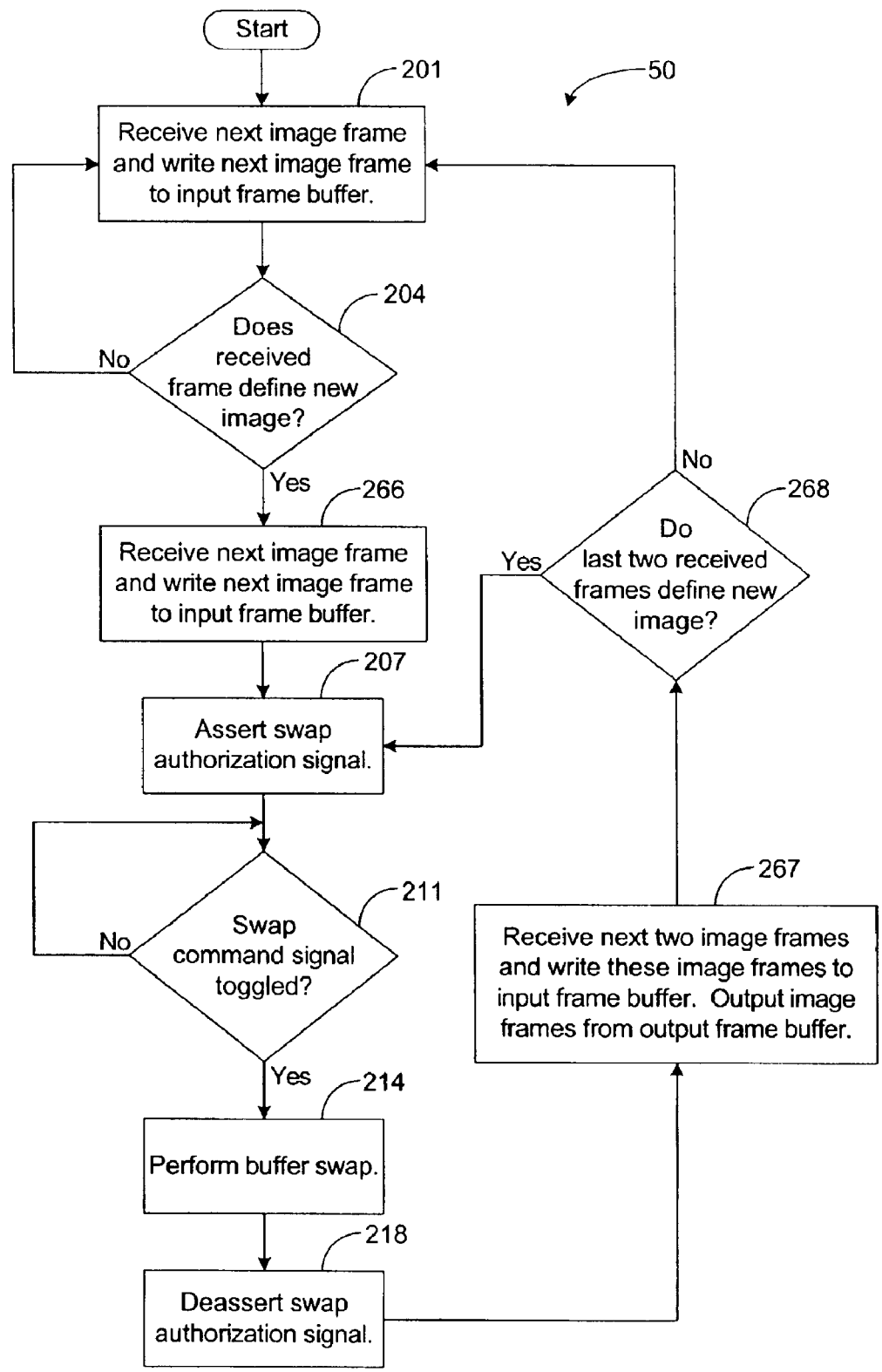
FIG. 9 is a flow chart illustrating an exemplary architecture and functionality of buffering logic such as is depicted in FIG. 2 for processing stereographic data.

Note that, if the graphics application 23 is configured to produce steroegraphic data instead of non-stereographic data, a process similar to the one depicted by FIGS. 7 and 8 may be employed to synchronize the image frames in the video data streams 28. In this regard, each set of buffering logic 50 may be configured to perform the steps shown by FIG. 7. However, between blocks 204 and 207, the buffering logic 50 preferably receives another image frame and writes this received image frame to its input frame buffer 46 or 47, as shown by block 266 of FIG. 9. Accordingly, one perspective of a newly received image is written to the input frame buffer 46 or 47 in block 201, and the other perspective of the same newly received image is written to the input frame buffer 46 or 47 in block 266. Therefore, in block 267, both perspectives of a newly received image frame are output via two consecutive image frames.

After outputting both perspectives of the newly received image frame, the logic 50 then checks, in block 268, to determine whether the last image frame received by the logic 50 (i.e., the image frame most recently received in block 267) defines the same image as the image defined by the last image frame being output in block 267. If so, the logic 50 proceeds to block 207. Otherwise the logic proceeds to block 201.

Figure 10:
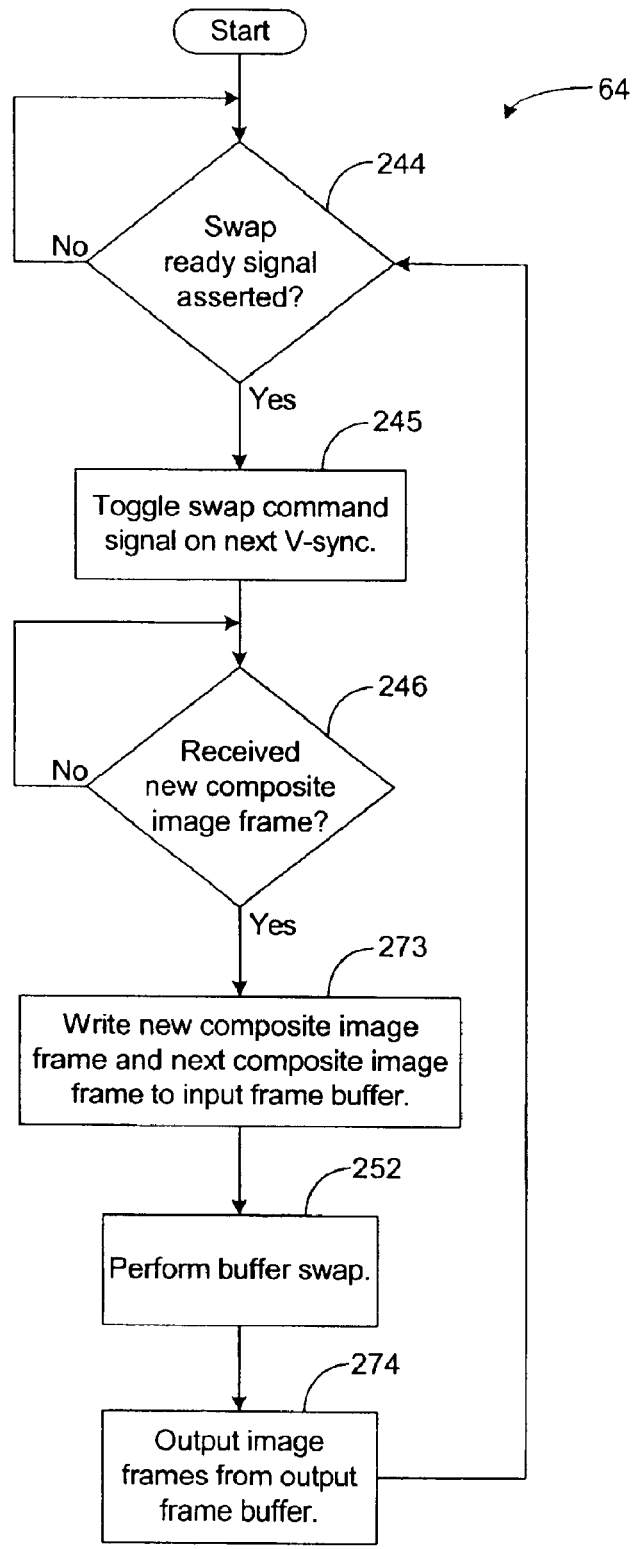
FIG. 10 is a flow chart illustrating an exemplary architecture and functionality of output buffering logic such as is depicted in FIG. 2 for processing stereographic data.

Furthermore, the output buffering logic 64 performs essentially the same steps shown by FIG. 8 when the logic 64 is processing stereographic data. However, as shown by FIG. 10, instead of writing a single image frame after block 246, the logic 64 writes the next two image frames to its input frame buffer 81 or 82 in block 273. Each of these two image frames preferably define a different perspective of the same image. Note that each of these image frames is output in block 274.

It should also be noted that having each set of buffering logic 50 to perform a buffer swap, via implementation of block 214 (FIG. 7), at the same time is not a necessary feature of the present invention. For example, in another embodiment, each set of buffering logic 50 may be configured to perform a buffer swap when it detects that the most recent image frame defines a new image in block 204. However, in such an embodiment, the set of buffering logic 50 is preferably configured to output the new image in response to a determination that all of the other sets of buffering logic 50 have similarly received a new image. In this regard, instead of performing a buffer swap in response to a determination that each set of buffering logic 50 has received a new image, as described above for FIG. 7, each set of buffering logic 50 outputs the new image in response to such a determination.

Figure 11:
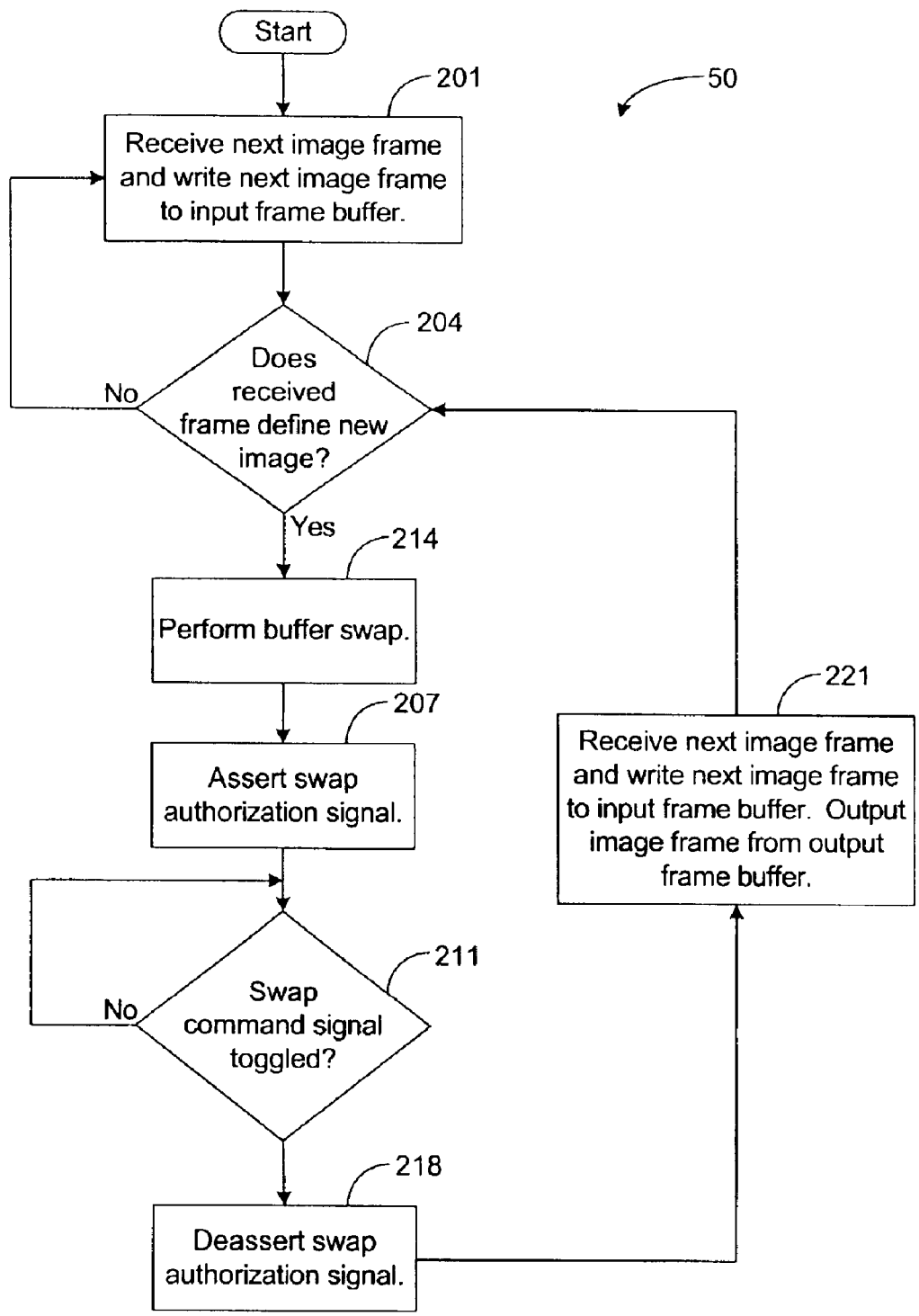
FIG. 11 is a flow chart illustrating another exemplary architecture and functionality of buffering logic such as is depicted in FIG. 2 for processing non-stereographic data.

FIG. 11 depicts another exemplary architecture and functionality of the buffering logic 50 in such an embodiment. As can be seen by comparing FIG. 7 to FIG. 11, the operation of the buffering logic 50 is the same in both embodiments except that in FIG. 11, block 214 is performed prior to, rather than subsequent to, block 211. However, performance of block 214 prior to block 211 does not change the effect of synchronously transmitting a new set of image frames in block 221 in response to assertion of signal 79. Moreover, in the embodiment depicted by FIG. 11, each of the sets of buffering logic 50 may perform buffer swaps at different times, but each of the sets of buffering logic 50, as in the embodiment shown by FIG. 7, preferably output an image frame of a new image at the same time (i.e., in block 221).

It should be noted that there are various methodologies, other than those described herein, for performing buffer swaps. For example, it is possible to employ a double buffer configuration where one of the buffers is always written to and where the other buffer is always read from. In such an embodiment, a buffer swap is performed by transferring data from the one frame buffer (i.e., the frame buffer being written to) to the other frame buffer (i.e., the frame buffer being read from). Moreover, such a double buffer configuration is generally well-known any may be utilized for implementing the buffers 46 and 47 of the synchronization system 15, if desired.

Therefore, having thus described the invention, at least the following is claimed:

1. A system for synchronizing video data streams, comprising:
   a plurality of frame buffer pairs; and
   buffering logic configured to receive image frames from a plurality of asynchronous video data streams and to perform comparisons between frame identifiers associated with the image frames; the buffering logic further configured to double buffer the image frames via the plurality of frame buffer pairs based on the comparisons and to synchronously output the image frames from the frame buffer pairs.

2. The system of claim 1, wherein the buffering logic is configured to discard an image frame received from one of the plurality of asynchronous video data streams based on one of the comparisons.

3. The system of claim 1, wherein the buffering logic is configured to perform buffer swaps on the frame buffer pairs based on the comparisons.

4. The system of claim 1, wherein the buffering logic is configured to make a determination, based on the comparisons, as to when each of the plurality of asynchronous video data streams has respectively transitioned from transmitting a current image frame to transmitting a new image frame, the buffering logic further configured to perform buffer swaps on the frame buffer pairs in response to the determination.

5. The system of claim 1, wherein the buffering logic is configured to make a determination, based on the comparisons, as to when each of the plurality of asynchronous video data streams has respectively transitioned from transmitting a current image frame to transmitting a new image frame, the buffering logic further configured to synchronously output a set of the image frames in response to the determination.

6. The system of claim 1, wherein the buffering logic is configured to perform a buffer swap on a least one of the frame buffer pairs in response to at least one of the comparisons.

7. The system of claim 1, wherein the buffering logic is configured to asynchronously input each of the asynchronous video data streams into a different one of the frame buffer pairs.

8. The system of claim 1, wherein the buffering logic, after determining that one of the buffer pairs has received a new image frame from one of the asynchronous video data streams, is configured to continuously prevent image frames from the one asynchronous video data stream from being stored in the one frame buffer pair until the buffering logic determines that each of the asynchronous video data streams has respectively transitioned from transmitting a current image frame to transmitting a new image frame.

9. The system of claim 8, wherein the buffering logic is configured to store an image frame from the one asynchronous video data stream in the one frame buffer pair in response to a determination that each of the asynchronous video data streams has respectively transitioned from transmitting a current image frame to transmitting a new image frame.

10. The system of claim 8, wherein the buffering logic is configured to perform buffer swaps on the frame buffer pairs in response to a determination that each of the asynchronous video data streams has respectively transitioned from transmitting a current image frame to transmitting a new image frame.

11. A system for synchronizing video data streams, comprising:
   logic configured to double buffer one of a plurality of asynchronous video data streams via a first frame buffer pair, the logic configured to make a determination as to whether a first image frame received from the one video data stream defines an image different than an image defined by a preceding image frame received from the one video data stream, the logic further configured to discard at least one image frame received from the one video data stream based on the determination;
   logic configured to double buffer another of the plurality of video data streams via a second frame buffer pair, the other video data stream comprising a second image frame; and
   logic configured to cause the logic configured to double buffer one of a plurality of video data streams and the logic configured to double buffer another of the plurality of data streams to synchronously output the first and second image frames from the first and second frame buffer pairs, respectively.

12. The system of claim 11, wherein the logic configured to double buffer one of a plurality of video data streams is further configured to perform a comparison between frame identifiers associated with the first image frame and the preceding image frame and to make the determination based on the comparison.

13. The system of claim 11, further comprising logic configured to cause the logic configured to double buffer one of a plurality of video data streams and the logic configured to double buffer another of the plurality of video data streams to perform a buffer swap on the first and second frame buffer pairs, respectively, based on the determination.

14. The system of claim 11, wherein the logic configured to cause is further configured to cause the logic configured to double buffer one of the plurality of video data streams and the logic configured to double buffer another of the plurality of video data streams to synchronously output the first and second image frames from the first and second frame buffer pairs based on the determination.

15. A method for synchronizing video data streams, comprising:
   receiving image frames from a plurality of asynchronous video data streams;
   performing comparisons between frame identifiers associated with the image frames;
   double buffering the image frames, via a plurality of frame buffer pairs, based on the comparisons; and
   synchronously outputting the image frames from the frame buffer pairs based on the comparisons.

16. The method of claim 15, further comprising discarding an image frame received from one of the plurality of asynchronous video data streams based on one of the comparisons.

17. The method of claim 15, further comprising:
   making a determination as to when each of the plurality of asynchronous video data streams has respectively transitioned from transmitting a current image frame to transmitting a new image frame; and
   performing buffers swaps on the frame buffer pairs in response to the determination.

18. The method of claim 15, further comprising:
   making a determination as to when each of the plurality of asynchronous video data streams has respectively transitioned from transmitting a current image frame to transmitting a new image frame,
   wherein the synchronously outputting is performed in response to the determination.

19. The method of claim 15, further comprising asynchronously inputting each of the asynchronous video data streams into a different one of the frame buffer pairs.

20. The method of claim 15, further comprising:
   inputting one of the asynchronous video data streams into one of the frame buffer pairs; and
   determining when each of the asynchronous video data streams has transitioned from transmitting a current image frame to transmitting a new image frame.

21. The method of claim 20, further comprising performing a buffer swap on each of the frame buffer pairs based in response to the determining.

22. The method of claim 20, further comprising continuously preventing, based on the determining, image frames from the one asynchronous video data stream from being stored in the one frame buffer pair until each of the asynchronous video data streams has respectively transitioned from transmitting a current image frame to transmitting a new image frame.

23. The method of claim 22, further comprising performing a buffer swap on each of the frame buffer pairs in response to the determining.

24. A method for synchronizing video data streams, comprising:
   receiving a plurality of asynchronous video data streams;
   double buffering one of the video data streams via a first frame buffer pair;
   making a determination as to whether a first image frame from the one video data stream defines an image different than an image defined by a preceding image frame of the one video data stream;
   discarding at least one image frame from the one video data stream based on the determination;
   double buffering another of the video data streams via a second frame buffer pair, wherein the other video data stream comprises a second image frame; and
   synchronously outputting the first and second image frames from the first and second frame buffer pairs, respectively.

25. The method of claim 24, further comprising:
   performing a comparison between frame identifiers associated with the first image frame and the preceding image frame, wherein the determination is based on the comparison.

26. The method of claim 24, further comprising:

performing a buffer swap on each of the first and second frame buffer pairs based on the determination.

27. The method of claim 24, wherein the synchronously outputting is performed based on the determination.

28. A system for synchronizing video data streams, comprising:

a plurality of frame buffer pairs; and buffering logic configured to respectively input to the frame buffer pairs a plurality of video data streams that are not frame synchronized with respect to one another, the buffering logic further configured perform buffer swaps on the frame buffer pairs based on comparisons of frame identifiers associated with image frames of the plurality of video data streams such that the frame buffer pairs double buffer the image frames and output a plurality of video data streams that are frame synchronized with respect to each other, each of the plurality of video data streams output from the frame buffer pairs comprising image frames from a respective one of the video data streams input to the frame buffer pairs.

29. The system of claim 28, wherein the buffering logic is configured to make a determination, based on the comparisons, as to when each of the plurality of video data streams input to the frame buffer pairs has respectively transitioned from transmitting a current image frame defining a current image to transmitting a new image frame defining a new image, the buffering logic further configured to perform buffer swaps on the frame buffer pairs in response to the determination.

30. The system of claim 28, wherein at least one of the video data streams input to at least one of the frame buffer pairs has consecutive image frames defining the same image, and wherein the buffering logic is configured to disable buffer swaps on each of the frame buffer pairs based on comparisons of frame identifiers associated with the consecutive image frames until the buffering logic detects an image frame defining a new image from the at least one video data stream.

31. The system of claim 30, wherein the frame identifiers associated with the consecutive image frames match.

* * * * *